United States Patent
Zscheile, Jr. et al.

[11] Patent Number: 6,154,451
[45] Date of Patent: Nov. 28, 2000

[54] METHOD FOR DISSEMINATION OF MULTI-SENSOR PRODUCTS

[75] Inventors: John Walter Zscheile, Jr., Rockledge; Bruce John Weber, Melbourne, both of Fla.

[73] Assignee: Northrop Grumman Corporation, Los Angeles, Calif.

[21] Appl. No.: 09/107,209

[22] Filed: Jun. 29, 1998

[51] Int. Cl.[7] .......................... H04J 11/00; H04L 27/00; H04B 7/185

[52] U.S. Cl. .................... 370/318; 370/206; 455/13.4; 455/69

[58] Field of Search .................. 370/203, 206, 370/318, 316, 465; 375/296, 297, 298; 455/12.1, 13.4, 69

[56] References Cited

U.S. PATENT DOCUMENTS

| | | | |
|---|---|---|---|
| 4,907,218 | 3/1990 | Inoue et al. | 370/201 |
| 5,103,459 | 4/1992 | Gilhousen et al. | 370/209 |
| 5,313,279 | 5/1994 | Wang et al. | 348/426 |
| 5,396,516 | 3/1995 | Padovani et al. | 375/225 |
| 5,414,728 | 5/1995 | Zehavi | 375/200 |
| 5,521,943 | 5/1996 | Dambacher | 375/295 |
| 5,537,441 | 7/1996 | Bremer et al. | 375/261 |
| 5,559,788 | 9/1996 | Zscheile | 370/206 |
| 5,790,533 | 8/1998 | Burke et al. | 370/318 |
| 5,864,547 | 1/1999 | Strodtbeck et al. | 370/318 |
| 6,023,606 | 2/2000 | Monte et al. | 455/13.1 |
| 6,070,074 | 5/2000 | Perahia et al. | 455/430 |

*Primary Examiner*—Min Jung
*Attorney, Agent, or Firm*—Terry J. Anderson; Karl J. Hoch, Jr.

[57] ABSTRACT

In a multi-mode dual channnel data link there is provided a method for automatically controlling or allocating a predetermined amount of power to each of the dual channels. Two diverse product signal are transmitted from a master station down link to a plurality of ground stations. The ground stations receive the diverse product signals and individually determine the integrity of each product signal and transmit the product integrity information and a station identifier back to the master station. The master station processes the integrity information and reallocates a predetermined percentage of total power to be transmitted from each of the dual channels to achieve a predetermined product integrity at one or more of the plurality of ground stations.

11 Claims, 6 Drawing Sheets

METHOD FOR DISSEMINATION OF MULTI-SENSOR PRODUCTS

RELATED APPLICATIONS

The present invention relates to my co-pending U.S. application Ser. No. 09/107,208 filed Jun. 29, 1998 for an Adaptable and Controllable Multi-Channel Data Link.

BACKGROUND OF THE INVENTION

1. Field of the Invention

The present invention relates to communication data links of the type employed between airborne platforms and ground stations. More particularly, the present invention relates to a novel multi-channel data link where each channel is independently and adaptably controllable for data rate and power.

2. Description of the Prior Art

It is known that airborne surveillance platforms are used to capture optical images, infrared images and/or radar images and to process the sensed information into a digital format for communication to a ground station or stations over a data link. Dual mode radar images have been captured and down loaded in real time over single channel data links.

In my U.S. Pat. No. 5,559,788 which is incorporated by reference herein, there is shown and described a multi-channel communications data link in which one input channel contains control information and the other quadrature input channel contains picture product information. In this patent, the two different types of information are combined and the combined data is transmitted over two different types of antennas. Then two different types of receivers are employed in ground stations in which only one of the receivers is capable of utilizing the picture product information.

It would be desirable to provide a dual channel data link capable of transmitting simultaneously two diverse picture products to all ground stations, even though not all of the ground stations can utilize both diverse picture products. It is further desirable to be able to control data throughput and transmission energy of the two diverse picture products in a manner which optimizes the use of available transmitter power and enhances picture quality at a plurality of the receivers.

SUMMARY OF THE INVENTION

It is a principal object of the present invention to optimize the reception of two diverse picture products at a plurality of ground station receivers.

It is a principal object of the present invention to transmit power representative of two diverse picture products over a multi-channel data link at controlled power levels.

It is a principal object of the present invention to determine at the transmitter the data integrity of the picture product being received at a ground station receiver to permit allocation of the percentage of total power between two diverse picture product signals transmitted to a plurality of ground station receivers.

It is a principal object of the present invention to provide a method and means for apportioning power between two diverse picture product channels that guarantees that at least one of the diverse picture products can be received by all ground station receivers.

It is a principal object of the present invention to provide a novel data link controller for proportioning power and setting data rates between two diverse picture product channels to guarantee that receivers in a maximum jamming hostile environment are supplied with a signal of sufficient signal to noise ratio strength so that the receiver can receive and display at least one of the desired diverse picture products without degradation.

It is a principal object of the present invention to control the power and data rate of transmission of one of said diverse picture product channels in a manner that all receiver users receive a useful picture product signal and any remaining power can be diverted to the other diverse picture product channel.

It is another principal object of the present invention to prioritize energy available at the transmitter to one of two diverse picture products channels and energy left over after supplying the higher priority picture product channel and to apportion the remaining power to the other picture product channel.

It is a general object of the present invention to be able to utilize and transmit the maximum amount of information available from a sensor in one of two diverse picture product channels and allocate all remaining energy to the remaining picture product channel.

It is another general object of the present invention to provide a continuously adaptive feedback loop signal which measures the data integrity of both diverse picture product channels and to continuously and adaptively control the data rate and power in the two diverse picture product channels independent of each other.

It is a general object of the present invention to provide a multi-channel data link apparatus and system for combining two orthogonal signals (in quadrature) and transmitting the two signals at the same frequency over a multi-mode data link communications channel.

According to these and other objects of the present invention, there is provided an apparatus and method for transmitting two picture products in the form of an in-phase and quadrature data component signal from an airborne platform which is received by ground station receivers capable of determining the inherent quality of the data component signals so that they are capable of transmitting back to the airborne platform signals indicative of the maximum data rate at which no picture quality errors or at which a standard of quality will occur at the present signal power level being received. The multi-mode data link processor continuously receives the signals from the plurality of ground station receivers and simultaneously adjusts the data rate and power level of the data component signals to obtain a predetermined optimum picture quality.

DETAILED DESCRIPTION OF THE PREFERRED EMBODIMENTS

Figure 1:
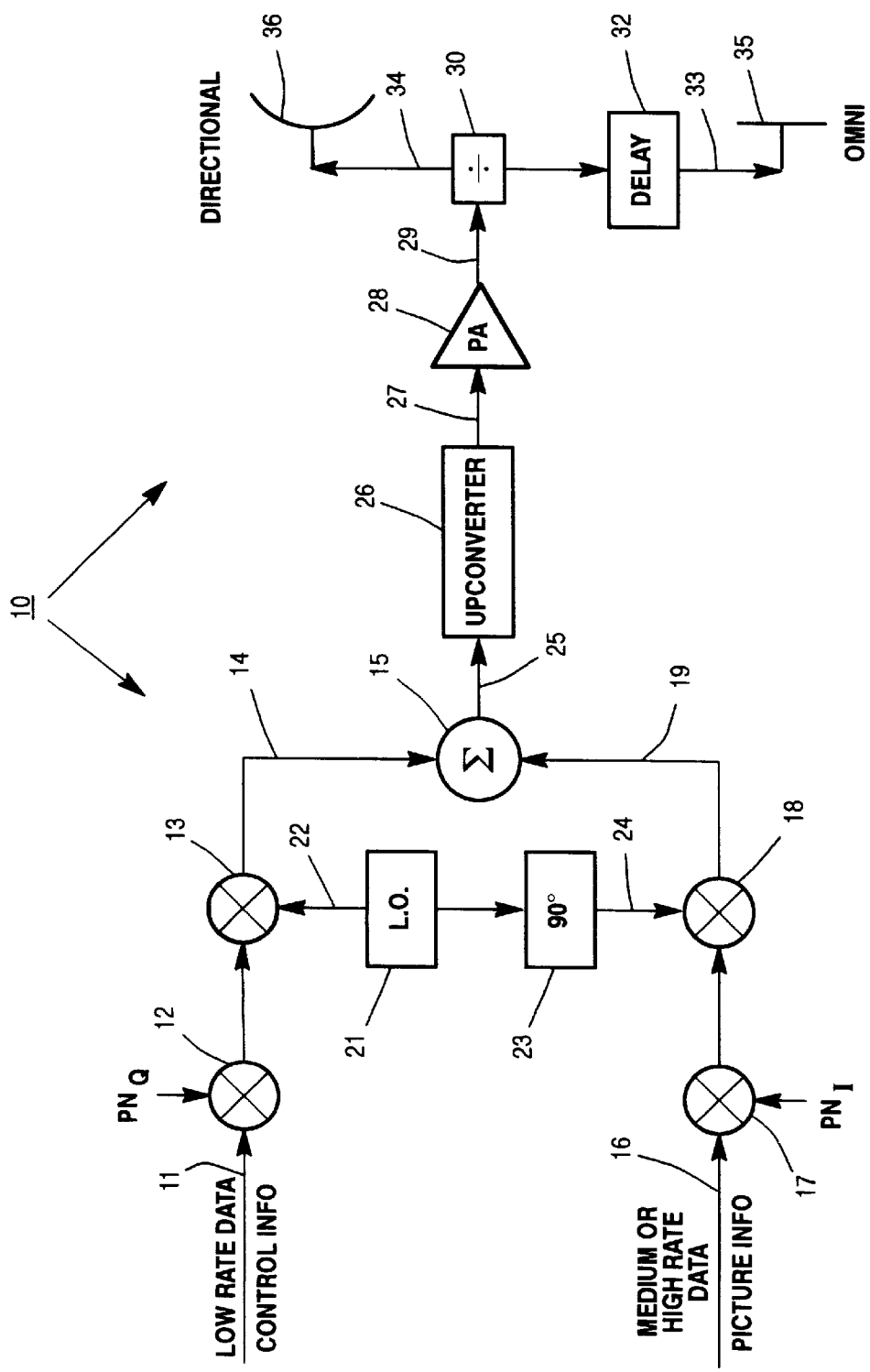
FIG. 1 is a schematic block diagram of a prior art transmitter having control information signals and picture information signals applied to quadrature and in-phase channels respectively of a modulator whose signals are then combined and transmitted from a pair of different type antennas for reception at different types of receivers.

Refer now to FIG. 1 showing a schematic block diagram of a prior art modulator/transmitter having a control information signal input line 11 coupled to an input of a mixer 12 having a pseudo noise input signal $PN_Q$ applied thereto to produce an output which is applied to an input of a second mixer 13. The second mixer 13 is shown having an oscillator input for producing a modulated output on line 14 which is applied to a summing device or circuit 15. A second medium or high data rate channel 16 is shown having a picture information input which is applied to a mixer 17 also having a pseudo noise input $PN_I$ for producing an output which is applied to a second mixer 18. The second mixer 18 is shown having a quadrature input derived from a local oscillator 21 which produces the in-phase oscillator signal on line 24 and the quadrature output on line 22 after being processed through a 90° phase shifter 23. The mixer 18 is shown having an output on line 19 which is applied to the summing circuit 15 to produce a combined output on line 25 which is applied to an up converter 26. The output of the up converter produces a combined RF signal on line 27 which is applied to a transmitter power amplifier 28 having an output 29 which is divided at divider 30 to produce two signals. The signal on line 34 is applied to a directional antenna 36 having both the control information signal from line 11 and the picture information from line 16 transmitted therefrom.

The combined signal on line 29 is also applied to a delay circuit 32 to decorrelate the two signals being divided at divider 30 and produces a decorrelated signal on line 33 which is applied to an omni directional antenna 35. In my prior art FIG. 1, the picture information is only on the in-phase channel 16 which is applied to the summing circuit 15 at line 19. Further, the control information is only on the quadrature channel 11 and inputted to the summing circuit 15 at line 14. The combined information is transmitted by two distinctly different transmitting antennas to two distinctly different receiving antennas for two distinctly different purposes. For example, both signals are transmitted on the directional antenna 36 and are of sufficient strength to be received by a receiver having a receiver-type antenna within the main beam of the transmitted signal. In contrast thereto, both signals are being transmitted on omni directional antenna 35 and being received by similar receivers, however, the strength of the signal being received by their receivers are only of sufficient strength to successfully demodulate the control information applied on quadrature channel 11.

Having explained the prior art modulator/transmitter 10, it will be observed that the picture product information is only applied to the one channel. The picture product information on line 16 and control information on line 11 are limited to a fixed rate and to a fixed power. There are no means or provision for allocating portions of the total power of the transmitter to either of the quadrature channels.

Figure 2:
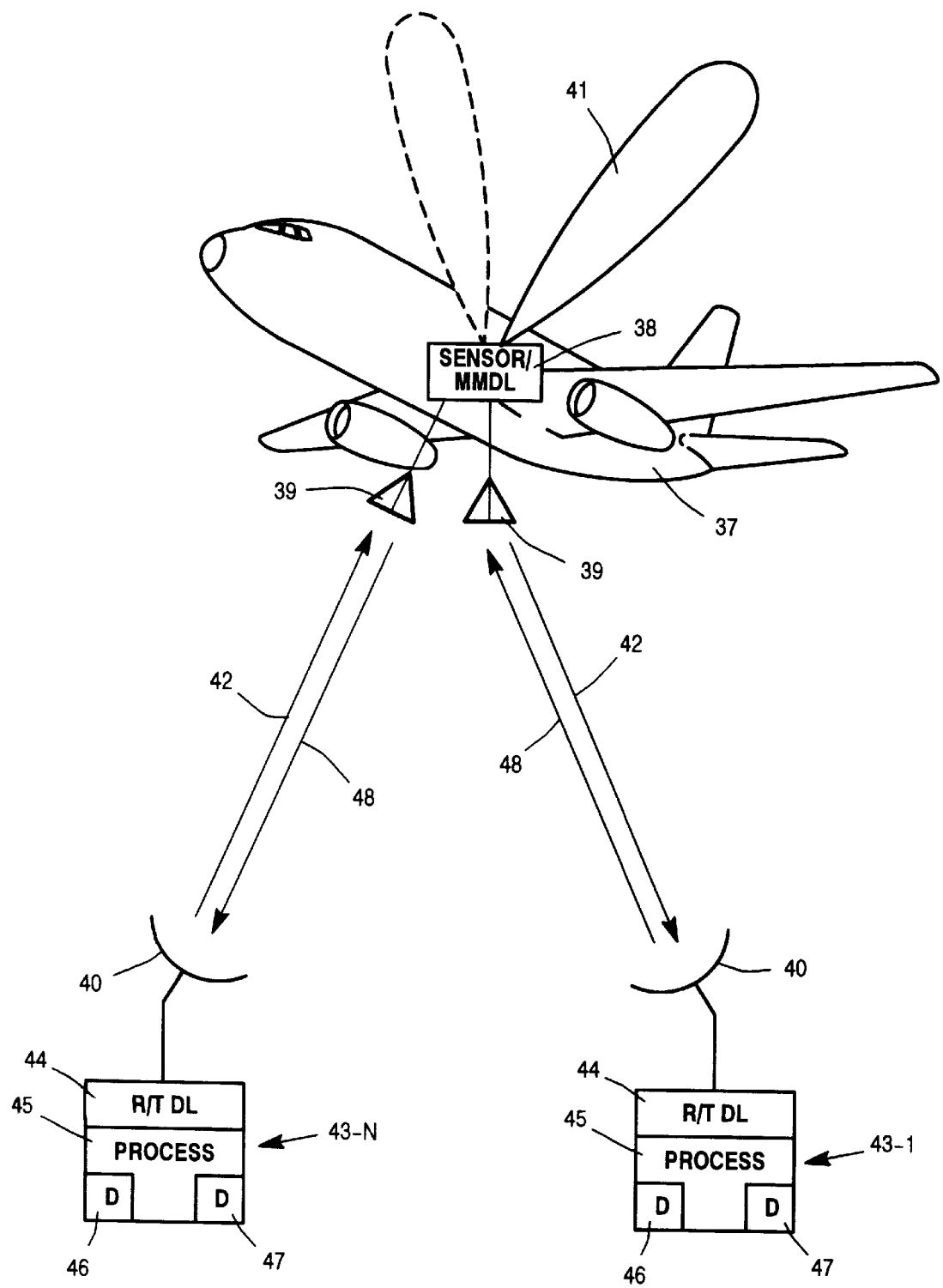
FIG. 2 is a schematic drawing illustrating the preferred embodiment in which the present invention is intended for use.

Refer now to FIG. 2 showing a schematic drawing illustrating the preferred embodiment in which the present invention is intended for use. In this drawing, the airborne platform 37 is an aircraft 37 having a sensor/multi-mode data link equipment device 38 which is coupled to an omni directional antenna receiver 39. The sensor produces a beam 41 for sensing ground activity using a multi-mode radar system. The antenna 39 produces a down link signal 42 which is received at the receiving/transmitting antennas 40 of the grounds stations 43-1 to 43-N. The ground stations are shown having receiver transmitter data links 44, processors 45 and displays 46 and 47 for displaying two distinctly different types of ground activity pictures. For example, one diverse picture would present anything in motion and the other diverse picture would present a snapshot or spot stationary picture of the ground surveillance area. After a ground station receives the down linked signal 42, it is processed in the processor 45 and a determination is made concerning the integrity of the received signal. The processor 45 generates an integrity signal and also determines the maximum rate which it can successfully demodulate the down link data signal. This information is now transmitted on up link 48 to the receiver antenna 39 for use in the sensor/MMDL 38 as will be explained in greater detail hereinafter. It will be understood that the airborne platform 37 may be a satellite or a helicopter or the equivalent can be produced by a fixed station at a high elevation which has line of sight to the receivers. Further, it is possible that some of the receivers can be airborne. Receiver ground stations 43-1 may be taken airborne and the same mode of operation and results will be achieved. There are numerous ways which information may be sensed. The three most common ways to sense the information are: electro-optical sensing, infrared sensing and radar sensing. The latter radar sensing is capable of producing two distinctly different products. One such product detects all motion and produces moving target reports to the receivers 43-1 to 43-N and the second produces a spot image or picture of all stationary objects within the beam of the scanner in the area of interest.

Figure 3:
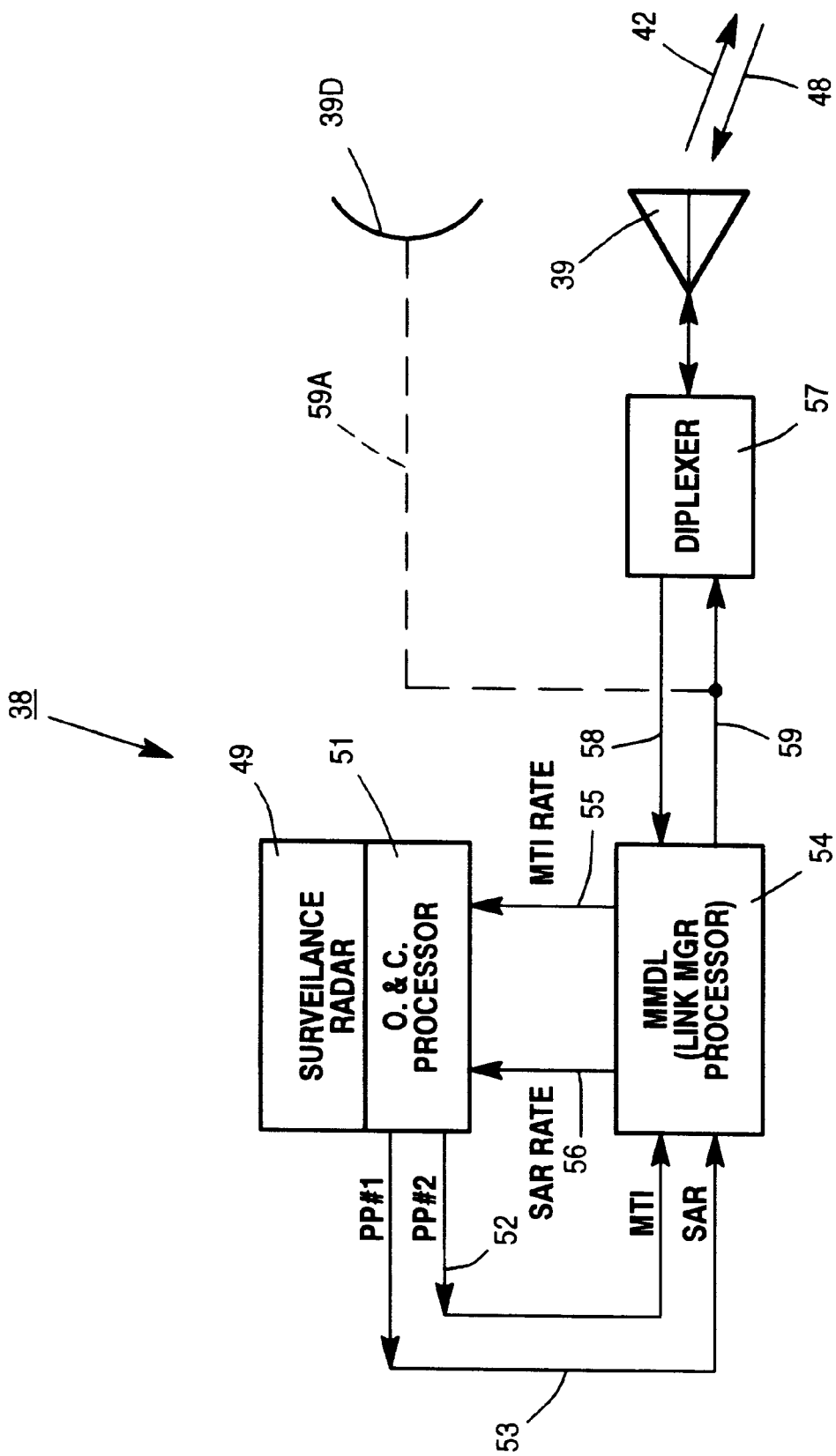
FIG. 3 is a schematic block diagram showing the preferred embodiment equipment which is used in the airborne platform.

Refer now to FIG. 3 showing a schematic block diagram of the preferred embodiment equipment which is used in the airborne platform 37. The equipment 38 in the airborne platform 37 is shown comprising a surveillance radar system 49 which is capable of producing two diverse picture product signals as will be explained in greater detail hereinafter. Coupled to and controlling the surveillance radar, there is shown an operation and control processor (O&C) 51 which produces the aforementioned picture product number 1 signal on line 53 and a picture product number 2 signal on line 52 which is coupled to the multimode data link manager processor 54. The multi-mode data link (MMDL) produces on line 55 a moving target indicator (MTI) data rate control signal which is applied as an input to the processor 51 and a synthetic aperture radar (SAR) data rate control signal 56 which is applied to the processor 51. The link manager processor is coupled to antenna 39, shown coupled to the down link signal 42 and up link signal 48 as explained hereinbefore.

The received signal is applied to a diplexer 57 which separates the desired received signal on line 58 that is applied to the link manager processor 54 and contains the data integrity information and the identification of the receiver which produced the information. The MMDL 54 processes this information to provide the MTI data rate command on line 56 and SAR data rate command on line 56.

Having explained the equipment 38 with reference to antenna 39 which is capable of transmitting and receiving, it will be understood that a second directional antenna 39D could be coupled by a line 59A directly into the MMDL 54. This would provide a second transmission path similar to the system shown in the prior art FIG. 1.

Figure 4:
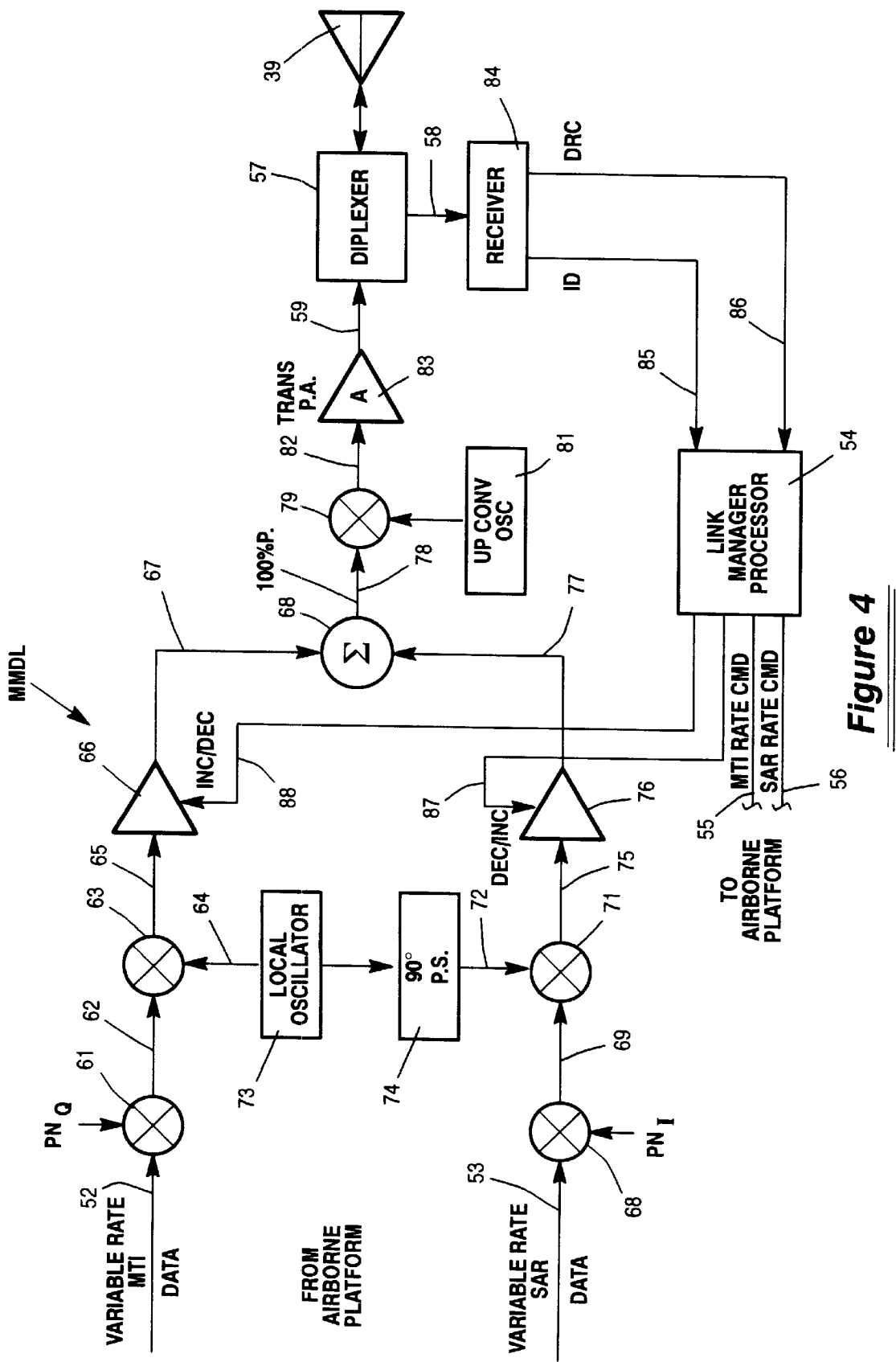
FIG. 4 is a more detailed schematic block diagram of the novel present invention multi-mode data link portion of the airborne equipment shown in FIG. 3.

Refer now to FIG. 4 showing a more detailed block diagram of the novel multi-mode data link (MMDL) portion of the airborne equipment shown in FIG. 3. The MMDL 54 comprises a modulator portion having an input channel shown having a variable rate MTI data at line 52. The signal on line 52 is applied to a mixer 61 along with a first pseudo noise signal shown as $PM_Q$ to produce a spread signal on line 62 that is applied to a second mixer 63. The second mixer 63 has shown a local oscillator input on line 64 which produces from the mixer 63 the IF signal on line 65. The signal on line 65 is applied to an adjustable gain control amplifier 66 which produces the quadrature component of the IF signal on line 67 which is applied to a summing circuit 68.

There is shown a variable rate SAR data input on line 53 being applied to an in-phase channel 53 and to a mixer 68 shown having a pseudonoise in-phase $PN_I$ signal at a second input to produce a spread signal output on line 69 that is applied to a second mixer 71. The second mixer 71 is shown having a quadrature 90° phase shifted oscillator signal on line 72 produced by oscillator 73 and 90° phase shifter 74. The phase shifted IF signal on line 75 from mixer 71 is applied to the input of a second adjustable gain amplifier 76 which produces an output on line 77. The in-phase component of the IF signal is applied to the summing circuit 68. The output from summing circuit 68 represents the 100% total power of the IF signal from the combined channels which is applied to a mixer 79 which has a second input from an up converting oscillator 81. The output from the mixer 79 on line 82 represents the radio frequency signal which is applied to a power amplifier 83. The power amplifier 83 produces the combined transmit signal of the two channels which passes through the diplexer 57 to the omni directional antenna 39 described hereinbefore. The omni directional antenna 39 has also been described as a receiving/transmitting antenna and signals being received therein pass through diplexer 57 onto line 58 to a receiver 84 inside of the MMDL 84. The receiver 84 is shown producing an ID signal on line 85 which corresponds to the identity of the ground station for the data received on line 86 from the same ground station whose identity is shown on line 85. Both lines 85 and 86 are coupled to the input side of link manager processor 54 which in turn produces the aforementioned signals on line 55 and 56 as shown in FIG. 3 and are here labeled the MTI data rate command and the SAR data rate command, respectively. Further, the link manager 54 produces control signals on lines 87 and 88 which are applied to the adjustable gain amplifier 66 and 76 to control the amount of power on lines 67 and 77, respectively. Other types of power controllers 66, 76 may be employed.

In the preferred embodiment of the present invention explained hereinbefore, the airborne platform 37 was shown having a dual mode radar sensor for producing two diverse and distinct picture products that are combined and transmitted from the same transmitter and the same antenna to a plurality of receivers 43. The receivers in turn have informed the link manager processor 54 the results of having received the image integrity signals resulting from the transmission signals 42 described hereinbefore. The identify and sustainable data rate information on lines 85 and 86 now permits the link manager processor to control the amplitude and data rate of the signals in the two channels shown starting at lines 52 and 53 respectively. The control of each channel is independent of the other as to both data rate and power.

As an example of the advantage of the present MMDL system, a receiver 43 may be located in a very hostile jamming environment condition and the MMDL system is capable of diverting and adapting sufficient power and data rate to the down link signal 42 to enable this receiver in its hostile environment to receive a completely usable picture product signal. The cost side of achieving this novel result is that the quadrature channel is robbed of part of its energy and therefore must reduce its data rate but still is capable of receiving a quality picture product image.

As a second example, when the receivers 43 are in a benign environment where no jamming or interference signals are present, then both channels can produce an optimum strength signal at a maximum data rate.

Figure 5:
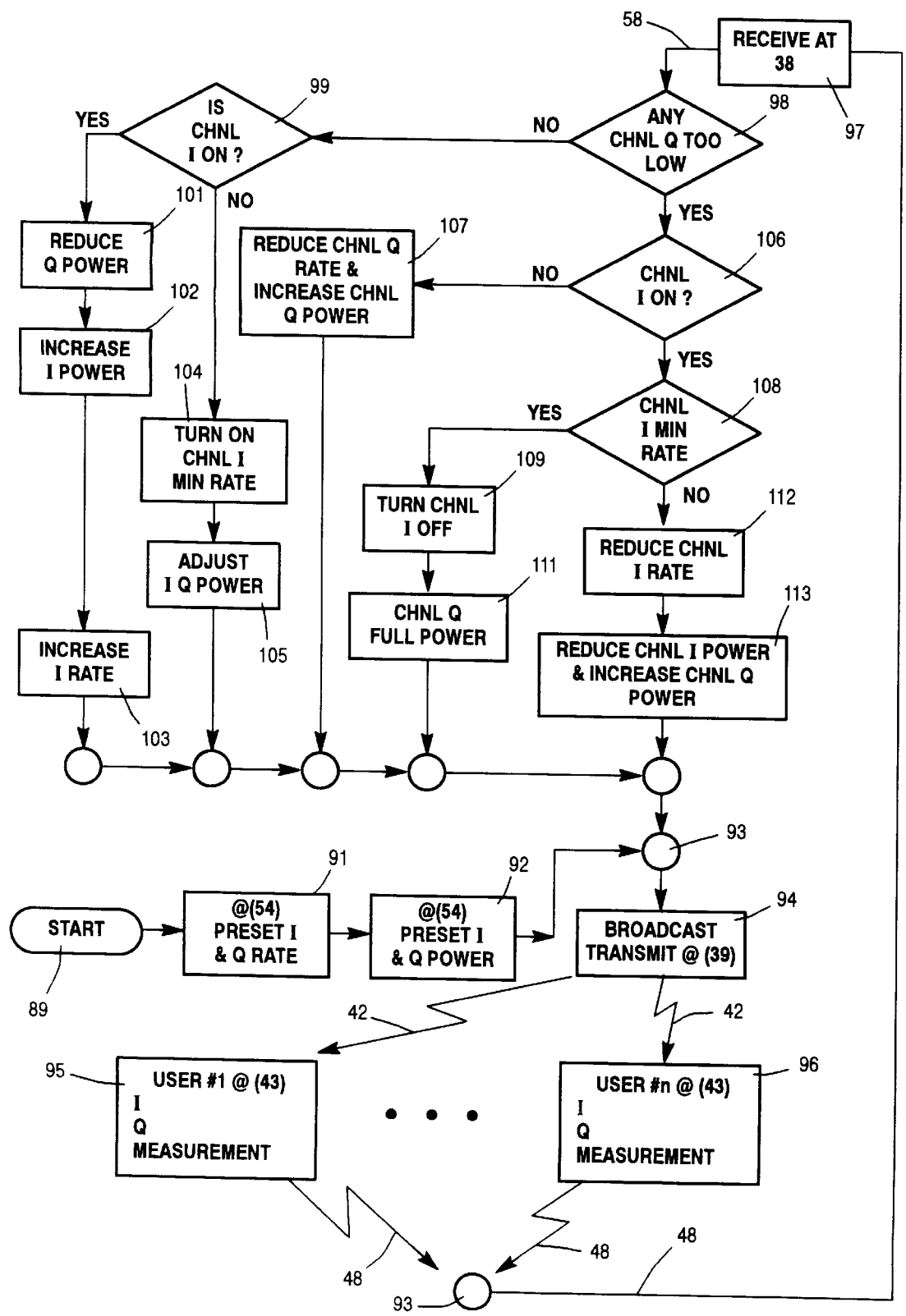
FIG. 5 is a schematic block flow diagram illustrating a method for optimum dissemination of multiple sensor products.

Refer now to FIG. 5 showing a schematic block diagram for illustrating a method for optimum dissemination of multiple sensor products. Block 89 starts the process which initiates the presetting of the I&Q data rate at block 91 followed by presetting the I&Q power at block 92. The next step in the sequence followed by the flow junction point 93 initiates the broadcast or transmittal at antenna 39 shown at block 94. Block 94 produces the down link signal shown at 42 which causes the receivers 43 to measure the I&Q channel integrity as shown at blocks 95 and 96. The receiver blocks 95 and 96 produce the up link signals shown at 48 that are shown being applied to a junction 93 which illustrates the flow of the signal back on line 48 to the receivers at 38 shown at block 97. The output from block 97 on line 58 is shown applied to a block 98 which determines if any of the channel Q in the receivers 43 has too little power. If not the logical flow from block 98 moves to block 99 and determines if channel I is ON. If the channel I is is ON, then in effect block 99 determines if there is any power in channel I when channel Q has excess power. If the answer is yes in block 99, then reduce the Q power in block 101. After reducing the Q power in block 101, increase the I power in block 102, then increase the I rate at block 103. After the power and rate are set, the logical flow of steps returns to junction 93 and the transmit broadcast block 94 to produce another change in down link signal 42.

Return now to block 99 and assume that channel I was not ON, then proceed to block 104 and turn on channel I to a minimum rate, then proceed to adjust the Q power at block 105 so that the total power in two channels remain the same. Then proceed to junction 93 and transmit the new signal on ground link 42.

Return now to block 98 and assume that at least one of the ground stations 43 reported that the channel Q power was too low. Following the Yes exit to block 106 where it is determined whether channel I is ON. If the answer is No then reduce the channel Q data rate at block 107 and increase the channel Q power, then proceed to junction 93 and transmit the new signal on down link 42.

If at block 106, channel I power was ON then proceed through the Yes decision to block 108 and check to see if channel I is at its minimum data rate. If the answer is Yes, proceed to block 109 and turn channel I OFF. After turning channel I off at block 109 then divert full power to channel Q as shown at block 111. Then proceed through junctions 93 to transmit broadcast block 94 and produce the new down link signal 42.

Return to block 108 and assume that channel I is not at the minimum rate and exit to logic block 112 and reduce the channel I rate. Then logically proceed to block 113 and reduce the channel I power and increase the channel Q power while maintaining the total power output. Then proceed to junctions 93 to the broadcast block 94 and transmit the new down link signal 42.

It will be observed that as the range between the ground stations 93 and the airborne platform 37 changes and/or if the atmospheric conditions between the airborne station and the ground stations changes so as to effect the power received and/or if the hostile environment (jamming environment) changes, then the loop will immediately change to compensate for the new environment.

There are two separate ways to continuously generate feedback signals which adjust to the conditions mentioned hereinbefore. In one set of conditions, the link manager processor 54 adjust in real time to the assumed accurate proper conditions. As a second alternative, it is possible to sense the actual conditions at discrete time intervals which are indicative of the rate of change or environment so that the closed loop feedback system substantially performs and adjusts on a periodic basis the same as if a continuous adjustment were being made.

Figure 6:
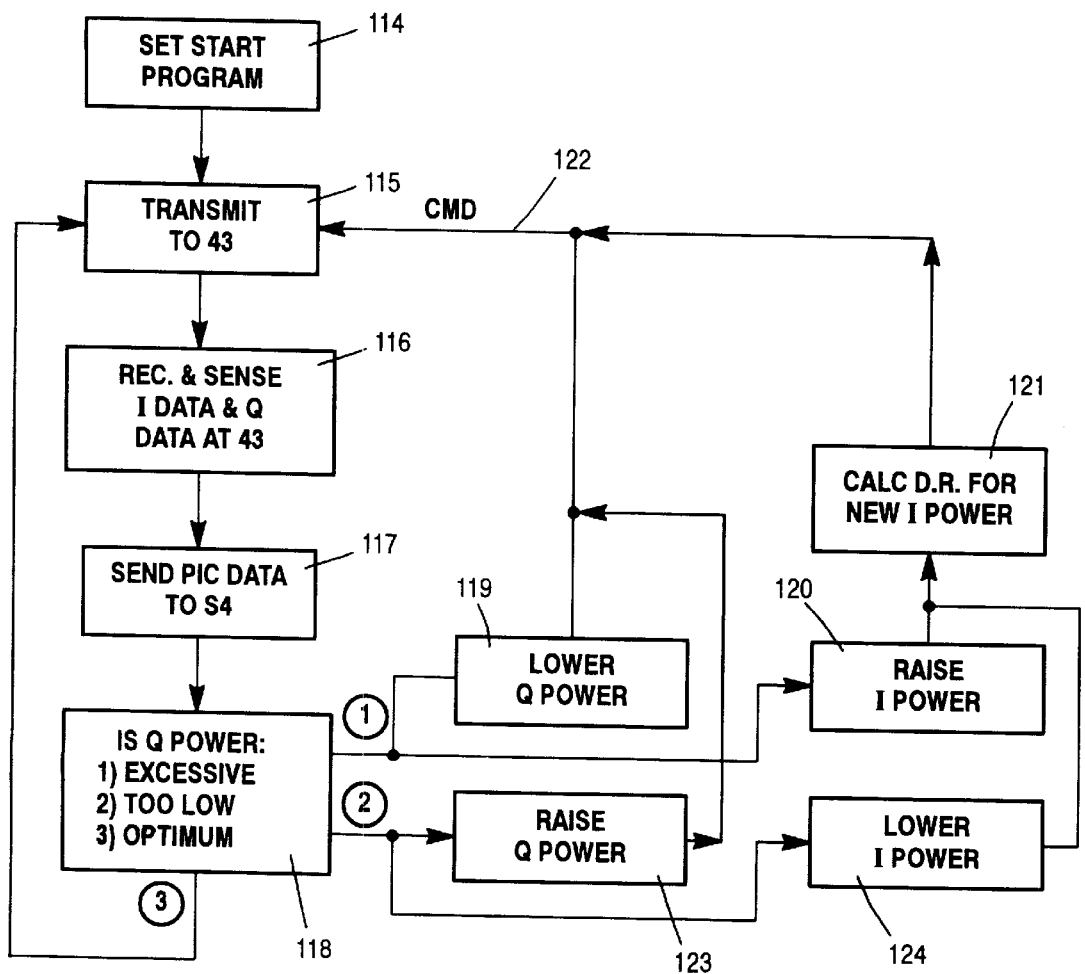
FIG. 6 is a schematic block flow diagram illustrating the broad principal of a closed loop feedback principal performed in FIG. 5.

Refer now to FIG. 6 showing a schematic feedback flow diagram used to illustrate one broad principal of the present invention. Before explaining FIG. 6, there will be assumed for the purpose of this explanation that channel 52 is the dominant channel for purposes of starting a program. Further, it will be assumed that the sensor/MMDL 38 contains a plurality of usable programs having different scenarios for anticipating different environmental conditions such as a peaceful status quo, a battle alert and/or a full battle conditions, etc. Thus as shown in FIG. 6 an appropriate program is selected at block 114. After starting the program, the airborne platform 37 transmits via antenna 39 down link signals 42 to the receivers 43 as shown at block 115. The next step in the sequence is to receive and sense the I&Q data at block 116 to determine the integrity of the data in each of the channels. The receivers then send the integrity data for each of the channels back to the airborne platform via up link 48 as shown at block 117. The link manager processor 54 receives the information from the receivers and makes one of three decisions as shown in block 118. If the Q power is excessive as shown at decision 1, then the Q power is lowered as shown in block 119. At the same time the I power is raised as shown at block 120. Subsequently, the link manager processor 54 calculates a new data rate for the new I power as shown at block 121 and commands via lines 55 and 56 of the O&C processor 51 to retransmit using the new recalculated power and data rate signals as shown on command line 122.

If the Q power is too low as shown in block 118, then the second decision alternative causes the Q power to be raised as shown at block 123. At the same time, the I power is lowered as shown at block 124. The output of block 124 causes the link manager processor 54 to calculate a new data rate for the new I power as shown at 122 and the loop is closed with a command on line 122 back to block 115.

Having explained a simplified close loop flow diagram for controlling the Q power to an optimum condition, it would be possible to permit the system to assume that the I power should be the dominant condition. This would reverse the rolls of the I&Q power in the flow diagram of FIG. 6.

Having explained a preferred embodiment of the present invention, it will be appreciated that human error can be introduced at the start of a program at block 114, however, the continuous feedback system shown in FIGS. 5 and 6 constantly change the preferred power conditions and data rates until an actual optimum condition is achieved in real time.

What is claimed is:

1. A method for changing the amount of power allocated to each channel of a dual channel data link, comprising the steps of:

allocating a percentage of total power to be transmitted in each of said channels in said data link, transmitting two diverse product data signals from an up link station to a plurality of down link stations, determining the integrity of each diverse product signal at each down link station, transmitting up link from each down link station a product integrity value for each product signal accompanied by a down link station identifier, and processing said up link product values in a link management processor to determine a minimum power allocation for one of said dual channels in said data link, reallocating a new percentage of total power to be transmitted in said one dual channel sufficient to supply said minimum power to a selected down link station, and allocating the remaining unallocated power to the other dual channel.

2. A method as set forth in claim 1 which further includes recalculating the data rate of the diverse product signal in the other said dual channels.

3. A method as set forth in claim 1 wherein said step of allocating a percentage of total power further includes the step of:

determining which of said dual channels shall be the dominant or primary channel for the allocation of power.

4. A method as set forth in claim 1 which further includes determining a data rate for a dominant channel of said dual channels.

5. A method as set forth in claim 1 which further includes, prior to said step of allocating the percentage of total power, the step of:

determining a select group of down link stations having a priority which allocates power in both channels that produces a usable signal in both channels.

6. A method as set forth in claim 5 which further includes a step of allocating a minimum power level to the same channels of a same group of down link stations, and allocating the remaining power to the other channel of the same group of down link stations.

7. A method as set forth in claim 1 which further includes, prior to the step of allocating the percentage of total power, the step of:

setting priorities for one or more ground stations to receive all allocatable power for a dominant channel, and allocating any excessive power from said stations so long as all priority stations receive a usable picture product signal in said dominant channel.

8. A method for controlling two diverse picture products, comprising the steps of:

transmitting two picture products in the form of in-phase and quadrature data component signals from an airborne platform to a plurality of ground stations, receiving said data component signals at said plurality of ground stations, determining the inherent data quality of said data component signals at said ground stations, transmitting to said airborne platform from said ground stations the maximum data rate at which picture errors will not occur at the predetermined signal power level being received, and simultaneously adjusting the data rate and the power level of said data component signals to obtain a predetermined optimum picture quality condition for at least one of said plurality of said ground stations.

9. A method as set forth in claim 8 wherein said step of simultaneously adjusting the data rate and the power level of the two picture product signals further includes the step of transmitting a data rate and power level of one of said picture products that assures a minimum optimum picture quality at a predetermined plurality of said ground stations.

10. A method as set forth in claim 9 wherein said predetermined plurality of ground stations includes as a minimum all ground stations of a selected type.

11. A method as set forth in claim 10 wherein said ground stations of a selected type comprise ground stations adapted to receive and process only one of said two picture products.

* * * * *